United States Patent
Sheridan

(10) Patent No.: US 8,910,669 B2
(45) Date of Patent: Dec. 16, 2014

(54) INSERT FOR PIPE ASSEMBLY AND METHOD FOR FORMING PIPE ASSEMBLY

(71) Applicant: Ticona LLC, Florence, KY (US)

(72) Inventor: David Michael Sheridan, Royal Oak, MI (US)

(73) Assignee: Ticona LLC, Florence, KY (US)

( * ) Notice: Subject to any disclaimer, the term of this patent is extended or adjusted under 35 U.S.C. 154(b) by 155 days.

(21) Appl. No.: 13/773,703

(22) Filed: Feb. 22, 2013

(65) Prior Publication Data

US 2013/0220474 A1    Aug. 29, 2013

Related U.S. Application Data

(60) Provisional application No. 61/602,196, filed on Feb. 23, 2012.

(51) Int. Cl.
  *F16L 9/00* (2006.01)
  *B32B 27/00* (2006.01)
  *F16L 47/02* (2006.01)

(52) U.S. Cl.
  CPC *B32B 27/00* (2013.01); *F16L 47/02* (2013.01)
  USPC .......................... 138/174; 138/126; 138/172

(58) Field of Classification Search
  CPC ............. F16L 57/02; F16L 9/04; F16L 9/003; F16L 11/08; F16L 11/082; F16L 11/086; F16L 11/085; B29D 23/001; B29K 2021/00; B29K 2105/06; B32B 27/00; B32B 1/08
  USPC ................... 138/172, 174, 123–126; 156/296
  See application file for complete search history.

(56) References Cited

U.S. PATENT DOCUMENTS

| | | | |
|---|---|---|---|
| 3,186,438 A * | 6/1965 | Holmgren | 138/121 |
| 3,991,243 A | 11/1976 | Biddell | |
| 4,167,953 A | 9/1979 | Carlstrom | |
| 4,289,168 A | 9/1981 | Lecourt et al. | |
| 4,295,496 A | 10/1981 | Bixby | |
| 5,307,842 A | 5/1994 | Lequeux | |
| 5,531,952 A | 7/1996 | Hatfield | |
| 5,638,870 A | 6/1997 | Takada et al. | |
| 5,752,725 A | 5/1998 | El-Sobky | |
| 6,048,428 A | 4/2000 | Millward et al. | |
| 6,197,395 B1 | 3/2001 | Van Vechten et al. | |
| 6,302,150 B1 * | 10/2001 | Martucci et al. | 138/125 |
| 6,324,833 B1 | 12/2001 | Singer et al. | |
| 6,581,644 B1 | 6/2003 | Monette et al. | |
| 6,649,685 B2 | 11/2003 | Saito et al. | |
| 6,773,773 B2 | 8/2004 | Hauber | |
| 6,780,506 B2 | 8/2004 | Oobayashi et al. | |

(Continued)

*Primary Examiner* — Frederick C Nicolas
(74) *Attorney, Agent, or Firm* — Dority & Manning, P.A.

(57) ABSTRACT

An insert, a pipe assembly, and a method for forming a pipe assembly are disclosed. The pipe assembly includes a hollow body and an insert bonded to the hollow body. The insert spans a knit line defined in the hollow body. The insert is formed from a fiber reinforced polymer material. The fibers are generally anisotropic, and preferably unidirectional, and the insert is oriented such that the fibers extend at an angle to the knit line and thus span the knit line. Preferably, the fibers extend perpendicularly to the knit line. The use of an insert having such an orientation reinforces the hollow body, particularly at the knit line. Thus, the use of such an insert bonded to a hollow body according to the present disclosure produces a pipe assembly having increased pressure ratings.

20 Claims, 4 Drawing Sheets

(56) References Cited

U.S. PATENT DOCUMENTS

| | | |
|---|---|---|
| 6,827,109 B2 | 12/2004 | McCaughtry |
| 6,830,077 B2 | 12/2004 | Hellgren et al. |
| 6,844,059 B2 | 1/2005 | Bernd et al. |
| 6,899,140 B2 | 5/2005 | Fraser et al. |
| 7,169,887 B2 | 1/2007 | Papke |
| 7,243,686 B2 | 7/2007 | Burke et al. |
| 7,314,067 B2 | 1/2008 | Lindsay |
| 7,316,427 B2 | 1/2008 | Nakagawa et al. |
| 7,347,227 B2 | 3/2008 | Zivanovic et al. |
| 7,360,718 B2 | 4/2008 | Yeh et al. |
| 7,432,323 B2 | 10/2008 | Oobayashi et al. |
| 7,475,705 B2 | 1/2009 | Lindsay |
| 7,490,861 B2 | 2/2009 | Boudry et al. |
| 7,528,206 B2 | 5/2009 | Kitano et al. |
| 7,597,363 B2 | 10/2009 | Hikmat et al. |
| 7,716,803 B2 | 5/2010 | Coutarel et al. |
| 7,855,238 B2 | 12/2010 | Cohoon et al. |
| 7,858,172 B2 | 12/2010 | Imaizumi et al. |
| 8,033,302 B2 | 10/2011 | Standal et al. |
| 8,034,211 B2 | 10/2011 | Andersen |
| 8,109,540 B2 | 2/2012 | Zepp et al. |
| 8,191,582 B2 * | 6/2012 | Kubel .......... 138/153 |
| 2001/0013675 A1 | 8/2001 | Nakagawa et al. |
| 2001/0045239 A1 | 11/2001 | Villatte et al. |
| 2003/0034082 A1 | 2/2003 | Vohrer |
| 2006/0272724 A1 | 12/2006 | Borland et al. |
| 2007/0028983 A1 | 2/2007 | Lord et al. |
| 2008/0150277 A1 | 6/2008 | Petruccelli et al. |
| 2009/0194186 A1 | 8/2009 | Gross |
| 2010/0084038 A1 | 4/2010 | Krishnaswamy et al. |
| 2010/0139802 A1 | 6/2010 | Papon et al. |
| 2010/0244432 A1 | 9/2010 | Neame et al. |
| 2011/0277868 A1 | 11/2011 | Emmons et al. |

\* cited by examiner

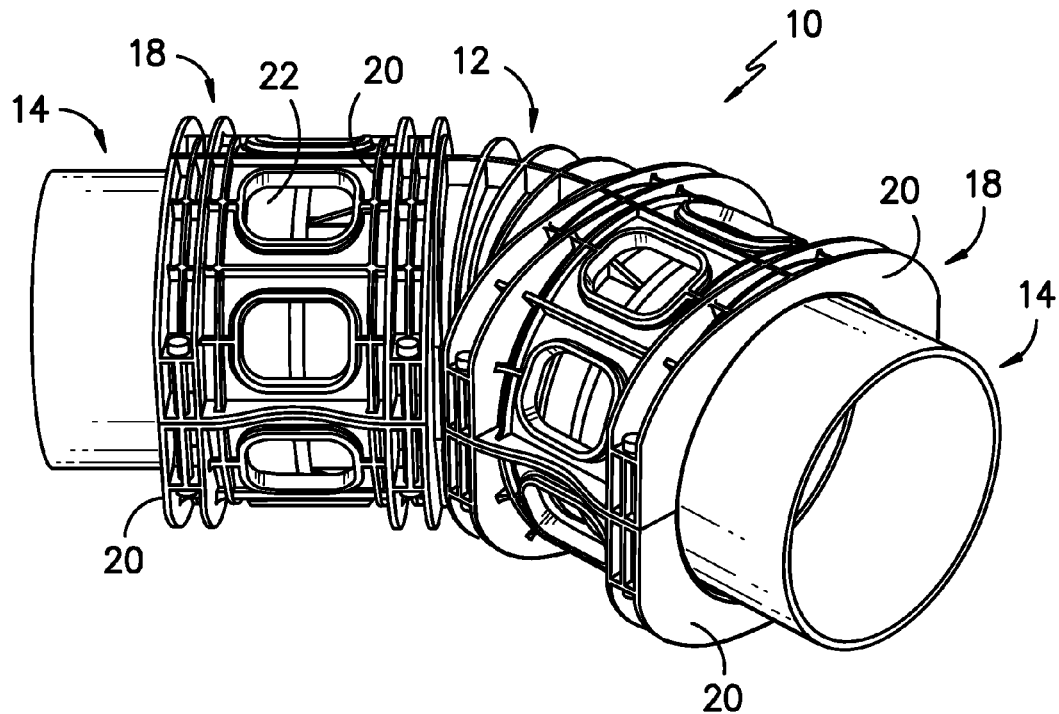
FIG. -1-
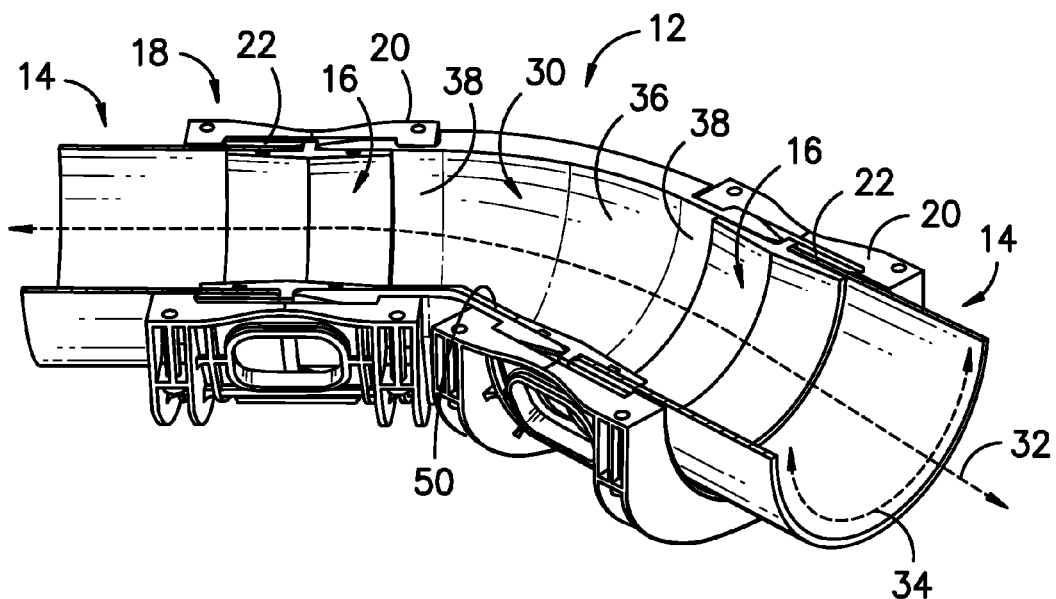
FIG. -2-

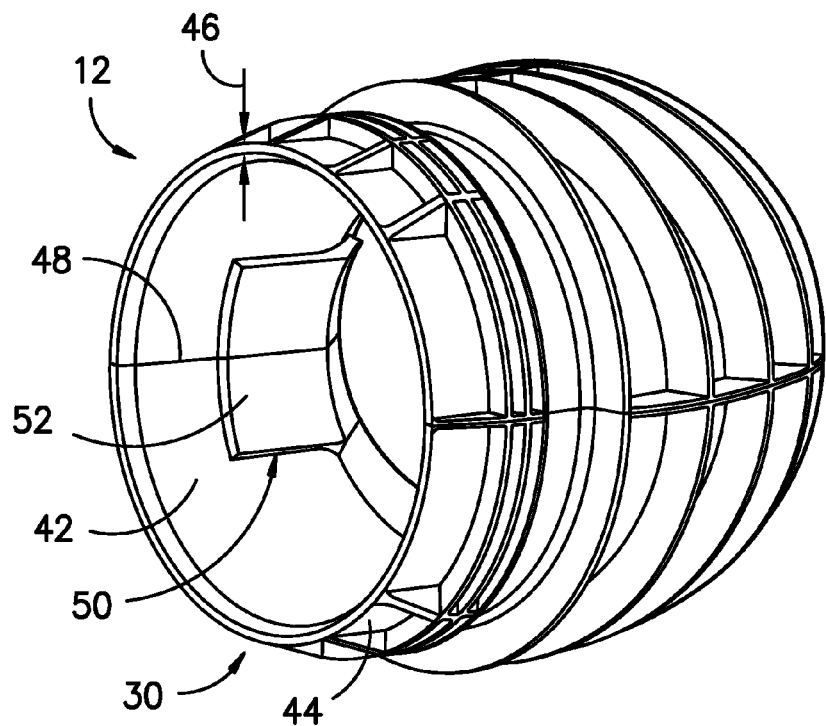
FIG. -3-
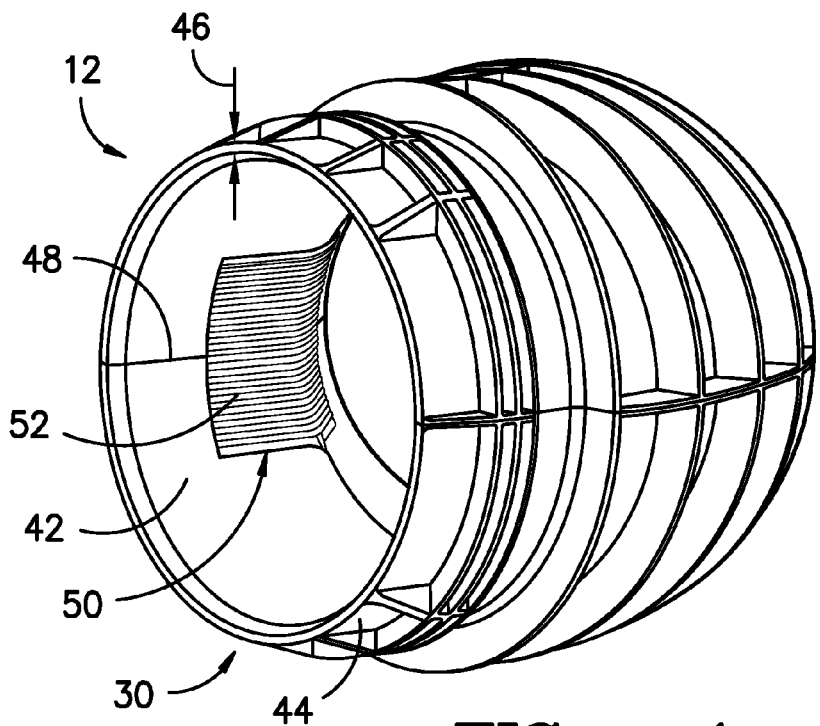
FIG. -4-

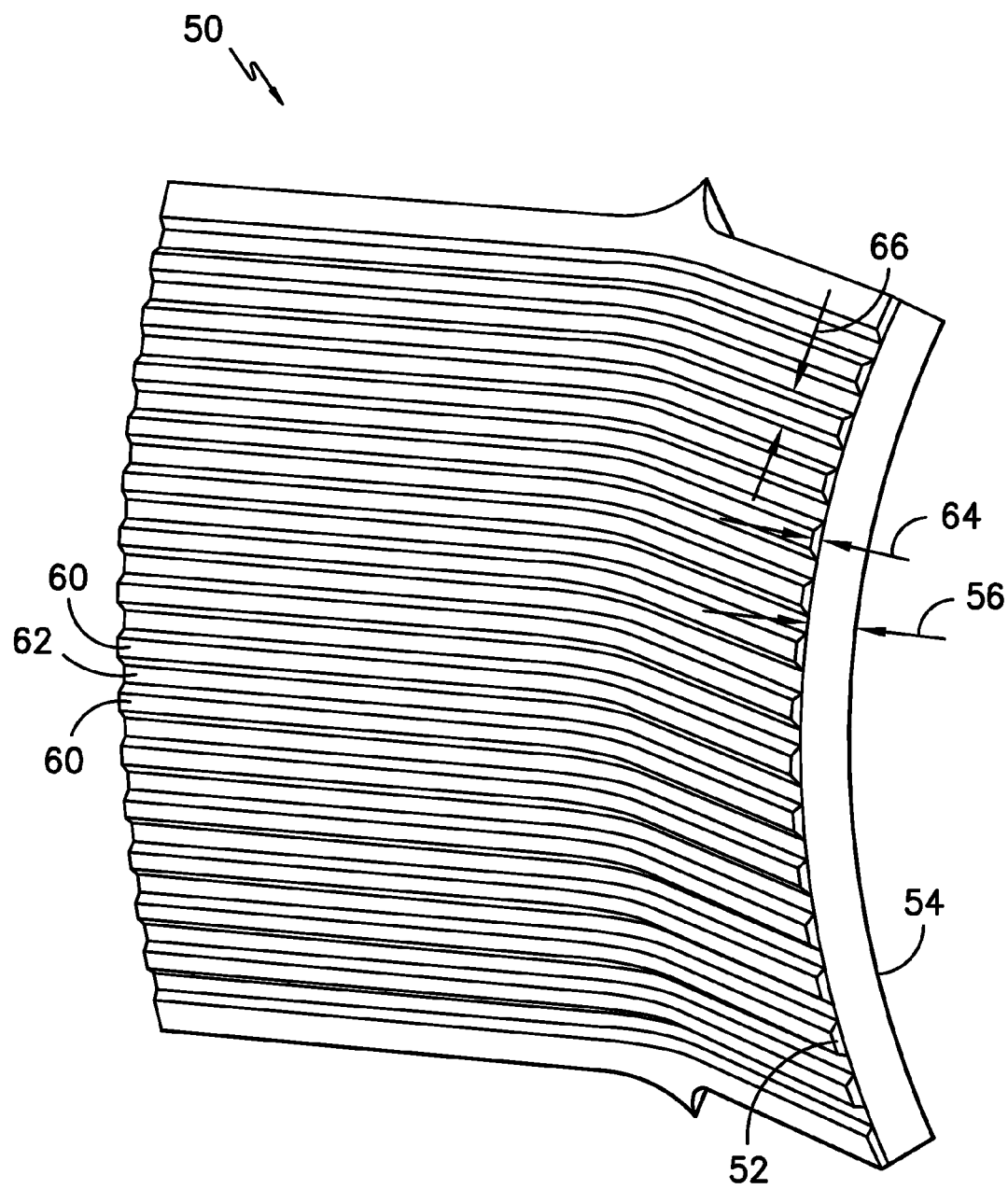
FIG. -5-

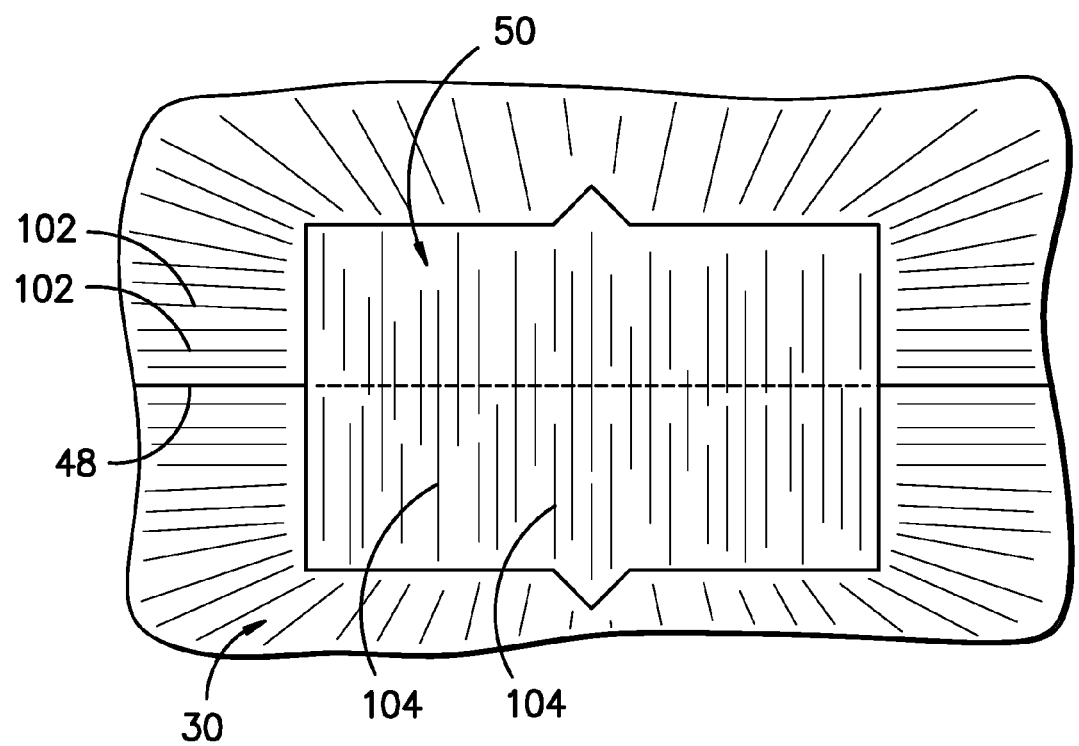
FIG. -6-

INSERT FOR PIPE ASSEMBLY AND METHOD FOR FORMING PIPE ASSEMBLY

This application relates to U.S. Provisional Patent Application Ser. No. 61/602,196, filed Feb. 23, 2012, titled: "Insert for Pipe Assembly and Method for Forming Pipe Assembly", which is hereby incorporated by reference in its entirety.

BACKGROUND OF THE INVENTION

Thermoplastic extruded reinforced piping to replace aluminum or other metals is becoming increasingly utilized in a wide variety of applications, generally to transport various fluids, such as liquids and/or gases, under pressure through the piping from a source to a destination. In many cases, the piping must span relatively long distances, and must contain pressurized fluids therein over these distances. Depending on the application, for example, the piping may extend over distances of many meters or kilometers. Thus, multiple sections of pipe are coupled with, for example, injection molded joints and assembled to provide a continuous pipe system for a fluid over such long distances. Pipe joints may be utilized to couple pipe sections together to facilitate the combination of the pipe sections to create continuous pipe systems.

In many cases, a pipe system may be required to change directions as it extends over a certain distance. For example, rather than extend longitudinally over an entire distance, a pipe system may be required to turn at, for example, a 30 degree, 45 degree, 60 degree, or 90 degree angle, or at any other suitable angle. In other cases, the size of the piping system may be required to increase or decrease. The pipe joints utilized to couple pipe sections together may facilitate these directional or size changes. For example, an elbow joint or T-joint may provide a directional change, and a reducer joint may decrease (or increase) the size of the piping system.

In the case of, for example, high pressure or high stress or strain applications, the strength and burst pressure ratings of piping, including pipe sections and pipe joints must be taken into account. In the case of, for example, injection molded fiber reinforced thermoplastic piping, particular attention must be paid to the burst strength. The weakest point in such a molding is at the knit line, where the flow fronts meet during the injection molding process. It would be industrially significant to provide improved pressure ratings for fiber reinforced polymer piping systems. Accordingly, improved piping, such as improved pipe joints and pipe sections, is desired in the art. In particular, apparatus and methods for producing piping having increase strengths and burst pressures would be advantageous. Further, apparatus and methods for producing reinforced piping that takes into account knit line concerns would be advantageous.

SUMMARY OF THE INVENTION

In accordance with one aspect, an insert for use in a piping assembly is disclosed. The insert may be a molded insert formed from a fiber reinforced polymer material. The plurality of fibers dispersed in the fiber material may have an anisotropic fiber orientation. The insert may include a front side and a back side, and may further include surface features provided on one or both of the front side and the back side. The preferred surface features include parallel ribs aligned at an angle to the fiber orientation. The ribs may be straight, or curvilinear, and may have width and depth dimensions as discussed below.

In accordance with another aspect, a pipe assembly is disclosed. The pipe assembly includes a fiber reinforced hollow body and a fiber reinforced insert bonded to the hollow body. The insert is in contact with and/or extends across a knit line defined in the hollow body, such as during injection molding. The insert is formed from a polymer material, which in exemplary embodiments is a thermoplastic, with a plurality of fibers dispersed therein. The fibers of the insert are dispersed preferably in an anisotropic orientation, and more preferably have a generally unidirectional orientation. The orientation of the fibers is angled to, and thus not parallel to, the knit line. Thus via placement of the insert on the hollow body, the fibers span the plane of the knit line. Preferably, the fibers extend predominantly at an angle perpendicular to the knit line and cross the knit line. The use of an insert having such an anisotropic fiber orientation reinforces the hollow body, particularly at the knit line. Thus, the use of such an insert bonded to a hollow body according to the present disclosure produces a pipe assembly having increased strength characteristics and pressure ratings.

In accordance with another embodiment of the present disclosure, a method for forming a pipe assembly is disclosed. The method includes forming an insert. The insert may be formed separate from a hollow body, and may then be utilized during formation of the hollow body. Thus, the insert in exemplary embodiments is provided in a mold, and a polymer material having fibers dispersed therein that forms the hollow body is flowed into the mold. The polymer material having fibers dispersed therein may be allowed to cure, thus producing a hollow body with the insert bonded thereto to form a pipe assembly. The insert may be oriented in the mold such that, when the hollow body is formed, the insert is in contact with and/or extends across a knit line defined in the hollow body, thus reinforcing the hollow body and producing a pipe assembly having increased strength characteristics and pressure ratings.

Other features and aspects of the present invention are set forth in greater detail below.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which:

FIG. 1 provides a perspective view of a pipe system according to one embodiment of the present disclosure;

FIG. 2 provides a cross-sectional perspective view of a pipe system according to one embodiment of the present disclosure;

FIG. 3 provides a perspective view of a pipe assembly according to one embodiment of the present disclosure;

FIG. 4 provides a perspective view of a pipe assembly according to another embodiment of the present disclosure;

FIG. 5 provides a perspective view of an insert for a pipe assembly according to one embodiment of the present disclosure; and FIG. 6 provides a front view of a pipe assembly illustrating fiber orientations for a hollow body and an insert of the pipe assembly according to one embodiment of the present disclosure.

Repeat use of reference characters in the present specification and drawings is intended to represent the same or analogous features or elements of the present invention.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present invention.

Generally speaking, the present disclosure is directed to a pipe assembly. The piping assembly generally includes a hollow body and an insert mounted to the hollow body. The insert is formed from a polymer having a plurality of fibers dispersed in the polymer. The fibers may generally be unidirectional. When the insert is mounted to the hollow body, the insert is oriented such that the fibers are angled with respect to a knit line of the hollow body. In exemplary embodiments, the fibers are approximately perpendicular to the hollow body. For example, in some embodiments wherein the knit line extends approximately longitudinally through the hollow body, the fibers of the insert may extend generally circumferentially with respect to the hollow body, and thus generally perpendicularly to the knit line. The use of an insert having fibers with such an orientation with respect to the knit line of the hollow body provides numerous advantages. For example, the use of such inserts advantageously reinforces the hollow body, providing increases in the strength, such as specifically the tensile strength and burst pressure rating, of the hollow body. This is caused by, for example, the penetration of fibers across the knit line of the hollow body due to the fiber orientation in the insert. Further, the use of inserts to provide these strength advantages eliminates the need for various additional steps during manufacturing of the pipe assembly. For example, when the pipe assembly is formed using an injection molding process, the use of an insert eliminates the need for a secondary fusing process, after injection molding is complete, to strengthen the pipe assembly. Thus, the time and expense associated with production of the pipe assemblies is decreased, and the associated production rates are increased.

FIG. 1 provides a perspective view of a pipe system 10 according to one embodiment of the present disclosure, while FIG. 2 provides a cross-sectional perspective view of the pipe system. The pipe system 10 includes a pipe assembly 12. In this embodiment, the pipe assembly is a pipe joint, and specifically an elbow joint. However, it should be understood that pipe assemblies 12 according to the present disclosure are not limited to pipe joints or elbow joints. For example, a pipe assembly 12 in alternative embodiments may be a T-joint, a reducer, a valve, or any other suitable pipe joint, or may be a pipe section (a section of generally straight pipe having in exemplary embodiments a generally constant cross-sectional area) or any other suitable pipe component. In the embodiment as shown, the pipe assembly 12 is a pipe joint that connects two pipe sections 14 together.

The pipe sections 14 may in exemplary embodiments be formed from suitable polymer materials. For example, a pipe section 14 according to the present disclosure, or a core layer thereof, may be formed from a thermoplastic material, which in exemplary embodiments is extruded and may further be unreinforced. Exemplary materials include polyolefins, such as polyethylene and more specifically high density polyethylene. In some embodiments, this core layer may be wrapped with one or more layers of a bondable polymer tape, such as a thermoplastic tape. The tape can be bonded to the core by preheating the tape and core to a required temperature, such as to close to the material melting point, such as within approximately 10 degrees from the melting point, and then placing the tape and core in contact with each other. Alternatively, the tape can be bonded to the core by initially placing the tape and core in contact and then heating the tape and core together. Flame bonding and laser bonding, as well as other bonding apparatus and methods known in the art, are suitable for bonding the tape and core together.

The pipe system 10 may further include various embodiments for coupling the various components of the pipe system together. For example, a pipe system 10 may include one or more connectors 16 and cages 18. A connector 16 may be a generally hollow component that can be inserted between and inside neighboring pipe system 10 components, such as between a pipe assembly 12 and pipe section 14 as shown, to connect the neighboring components and provide a bridge between them. A cage 18 may be a generally hollow component that surrounds the neighboring components to ensure that the components are securely coupled together. In some embodiments, the cage 18 may include a plurality of cage portions 20, which may be fastened together to secure the neighboring components together. As shown, in some embodiments, a pipe system 10 may further include one or more pipe shoulders 22. A pipe shoulder 22 is a generally hollow component that is mounted to an exterior surface of a pipe component, such as a pipe section 14 as shown, on an end of the pipe component to reinforce the pipe component. The pipe shoulder 22 may be a separate component from the pipe component, or may be integral with the pipe component and thus be a portion of the pipe component having a greater thickness than the remainder of the pipe component.

Various embodiments of a pipe assembly 12 according to the present disclosure are further shown in FIGS. 3 and 4. A pipe assembly 12 according to the present disclosure includes a hollow body 30. The hollow body 30 extends in a generally longitudinal direction 32, as shown. It should be noted that the longitudinal direction 32 is a direction generally through the center of the hollow body 30, and may correspond for example to a flow direction through the hollow body 30. Thus, the longitudinal direction 32 may curve at any suitable angle as required based on the curvature of the hollow body 30.

In exemplary embodiments, the hollow body 30 has a generally circular or oval cross-sectional shape, although in other embodiments the hollow body 30 may have any suitable cross-sectional shape. A circumferential direction 34 may further be defined for the hollow body 30 as shown. The circumferential direction 34 extends perpendicularly to the longitudinal direction and along an inner surface 42 of the hollow body 30, as shown. It should be understood that the circumferential direction 34 encompasses both a circumferential direction along the circumference of a circular or oval shaped hollow body 30 (or inner surface thereof) and a perimetral direction along the perimeter of an otherwise shaped hollow body 30 (or inner surface thereof).

Further, in some embodiments as shown, the hollow body 30 may include a curved portion 36. The curved portion 36 may adjust the longitudinal direction 32 by any suitable angle, such as by approximately 30 degrees, approximately 45 degrees as shown, approximately 60 degrees, approximately 90 degrees, or any other suitable angle. The curved portion 36 may be positioned between straight portions 38, as shown.

The hollow body 30 further includes an inner surface 42 and an outer surface 44. A thickness 46 of the hollow body 30 may be defined between the inner surface 42 and outer surface 44.

A hollow body 30 according to the present disclosure is formed from a suitable polymer material. Any of a variety of polymers, such as in exemplary embodiments thermoplastics, may be utilized to form the hollow body. Suitable polymers for use in the present invention may include, for instance, polyolefins (e.g., polypropylene, propylene-ethylene copolymers, etc.), polyesters (e.g., polybutylene terephalate ("PBT")), polycarbonates, polyamides (e.g., Nylon™), polyether ketones (e.g., polyetherether ketone ("PEEK")), polyetherimides, polyarylene ketones (e.g., polyphenylene diketone ("PPDK")), liquid crystal polymers, polyarylene sulfides (e.g., polyphenylene sulfide ("PPS")), fluoropolymers (e.g., polytetrafluoroethylene-perfluoromethylvinylether polymer, perfluoro-alkoxyalkane polymer, petrafluoroethylene polymer, ethylene-tetrafluoroethylene polymer, etc.), polyacetals, polyurethanes, polycarbonates, styrenic polymers (e.g., acrylonitrile butadiene styrene ("ABS")), and so forth. Polypropylene and polyethylene are particularly suitable polymers.

Further, a plurality of fibers are dispersed in the polymer material forming the hollow body 30. Thus, the material is a fiber reinforced polymer material. The fibers are in exemplary embodiments long fibers, although in other embodiments the fibers may be continuous fibers. As used therein, the term "long fibers" generally refers to fibers, filaments, yarns, or rovings that are not continuous, and as opposed to "continuous fibers" which generally refer to fibers, filaments, yarns, or rovings having a length that is generally limited only by the length of a part. The fibers dispersed in the polymer material to form the hollow body 30 may be formed from any conventional material known in the art, such as metal fibers, glass fibers (e.g., E-glass, A-glass, C-glass, D-glass, AR-glass, R-glass, S1-glass, S2-glass), carbon fibers (e.g., graphite), boron fibers, ceramic fibers (e.g., alumina or silica), aramid fibers (e.g., Kevlar® marketed by E. I. duPont de Nemours, Wilmington, Del.), synthetic organic fibers (e.g., polyamide, polyethylene, paraphenylene, terephthalamide, polyethylene terephthalate and polyphenylene sulfide), and various other natural or synthetic inorganic or organic fibrous materials known for reinforcing polymer compositions. Glass fibers and carbon fibers are particularly desirable for use in the fibers.

In preferred embodiments, a long fiber reinforced thermoplastic material may be utilized. The fibers may be made by pultruding continuous fiber rovings, such as glass fiber rovings, and chopping them into pellets. The fiber length can equal the pellet length and generally can range from approximately 3 millimeters to approximately 25 millimeters. The preferred rovings contain a sizing system which is capable of chemically coupling to the thermoplastic matrix resin. The volume fraction of fibers can range generally from approximately 5% to approximately 70%, preferably from approximately 20% to approximately 60%. Methods to form long fiber reinforced thermoplastic injection moldable materials are disclosed in, for example, U.S. Pat. Nos. 7,858,172; 7,855,238; 7,528,206; 7,432,323; 7,169,887; 6,844,059; 6,780,506 and 6,649,685, all of which are expressly incorporated by reference herein and for all purposes.

A hollow body 30 according to the present disclosure is in exemplary embodiments formed using an injection molding process. In this process, a polymer material with dispersed fibers is flowed into a mold through one or more gates defined in the mold. After being flowed into the mold, the polymer material with dispersed fibers may be allowed to cure to form the hollow body 30. The injection molding process, and other suitably related processes, however, may cause a knit line to be formed in the hollow body. A knit line, also known as a weld line or meld line, is a line where opposing flow fronts meet during the process of forming the hollow body 30, such as during the molding process. A hollow body 30 according to the present disclosure thus includes a knit line 48 defined extending through at least a portion of the hollow body 30. The knit line 48 extends in any suitable direction. In some embodiments, as shown, the knit line 48 extends generally along the longitudinal direction 32, and through the entire hollow body 30 generally along the longitudinal direction 32. In other embodiments, the knit line 48 may extend at a suitable angle to the longitudinal direction 32, and may for example extend along the circumferential direction 34.

The fibers dispersed in the polymer material and forming the hollow body 30 may, due to the formation of the hollow body 30 causing the knit line 48, not cross over the knit line 48. Further, in exemplary embodiments, the fibers proximate the knit line 48 may be oriented generally parallel to the knit line 48. As a result, and as discussed above, the knit line 48 of the hollow body 30 is a weak point for the hollow body 30, and can lead to failure of the hollow body 30 during operation of the pipe assembly 12 and pipe system 10. Thus, a pipe assembly 12 according to the present disclosure further includes one or more inserts 50.

Various embodiments of inserts 50 are shown in FIGS. 3 through 5. An insert 50 according to the present disclosure is bonded to the hollow body 30, and provides reinforcement to the hollow body 30, thus strengthening the hollow body 30 and increasing the pressure rating of the resulting pipe assembly 12. An insert 50 includes an inner surface 52 and an outer surface 54, which may alternatively be referred to as a respective front side and back side. A thickness 56 of the insert 50 may be defined between the inner surface 52 and outer surface 54. The insert 50 is positioned on the hollow body 30 in contact with at least a portion of the knit line 48, and may thus extend across this portion of the knit line 48.

An insert 50 according to the present disclosure is formed from fiber reinforced polymer material. This material includes a a suitable polymer material, as discussed above with respect to the hollow body 30. Further, a plurality of fibers, which may be long fibers and/or continuous fibers, are dispersed in the polymer material forming the insert 50, as discussed above with respect to the hollow body 30. In exemplary embodiments, the insert 50 is anisotropic with respect to the orientation of the fibers in the polymer material. Further, the fibers dispersed in the polymer material may be generally unidirectional, with generally all or a substantial portion of the fibers extending in the same direction.

An insert 50 according to the present disclosure may be formed using any suitable process. In some embodiments, for example, the insert 50 may be injection molded, as discussed above with respect to the hollow body 30. Notably, in exemplary injection molding embodiments, one gate is utilized for flowing the polymer material and dispersed fibers into a mold, and the gate may be positioned to facilitate unidirectional flow, which may produce an anisotropic insert 50. In other embodiments, a sheet of polymer material having a plurality of fibers dispersed therein may be extruded, and then die cut and compression molded to form the insert 50. The polymer fibers in the sheet may in exemplary embodiments be generally unidirectional, thus producing an anisotropic insert 50. In still other embodiments, a thick tape, which may be formed from multiple layers of tape, may be die cut to form an insert 50. The layers of tape may be unidirectional, to produce an anisotropic insert 50. Each layer may include long fibers and/or continuous fibers. In some embodiments, all of the layers of tape include long fibers or continuous fibers. In other embodiments, layers including long fibers and layers including continuous fibers may be combined to form a hybrid tape, which may then be die cut to form the insert 50.

In exemplary embodiments, the polymer materials utilized in the hollow body 30 and the insert 50 are the same, or in the same class. In exemplary embodiments, the polymer materials utilized in the hollow body 30 and the insert 50 may both be polyolefins. For example, both may be polypropylene, or both may be polyethylene, or one may be polypropylene while the other is polyethylene, etc. The utilization of such materials may advantageously allow for thermal bonding of the hollow body 30 and the insert 50, as discussed below.

As illustrated in FIG. 6, the insert 50 is oriented with respect to the hollow body 30 and knit line 48 such that the fibers of the insert 50 are angled with respect to the knit line 48. In exemplary embodiments, the fibers of the insert 50 are perpendicular to the knit line 48. Thus, in embodiments wherein the knit line 48 extends in the longitudinal direction 32, the fibers of the insert 50 may extend in the circumferential direction 34. In other embodiments, the fibers of the insert 50 may be oriented at a suitable angle to the knit line 48, such as at an angle between approximately 45 degrees and approximately 90 degrees, approximately 60 degrees and approximately 90 degrees, or approximately 80 degrees and approximately 90 degrees. FIG. 6 provides an illustration of one embodiment of the orientation of the insert 50 with respect to the hollow body 30 and knit line 48. As shown, the fibers of the hollow body 30 proximate the knit line 48, labeled as reference numeral 102, extend generally parallel to the knit line 48. The fibers of the insert 50, labeled as reference numeral 104, extend generally perpendicular to the knit line 48 and the fibers 102 of the hollow body 30. The orientation of the fibers 104 with respect to the knit line 48 and the fibers 102 proximate the knit line 48 provides reinforcement to the hollow body 30, thus increasing the strength of the hollow body 30. This is caused by the penetration of the fibers 104 across the knit line 48, which thus strengthens this portion of the hollow body 30 and eliminates the knit line 48 as a weak point on the hollow body 30.

In some embodiments, as shown in FIG. 3, the inner surface 52 of the insert 50 may be generally smooth. In other embodiments, as shown in FIGS. 4 and 5, the inner surface 52 and/or the outer surface 54 may include various surface features. For example, in exemplary embodiments as shown, the inner surface 52 as shown and/or the outer surface surface 54 may be corrugated, and may thus include a plurality of ribs 60. As shown, one or more ribs 60 may be defined on the inner surface 52 and/or outer surface 54 of the insert 50. Channels 62 between the ribs 60 may separate and define the ribs 60. The ribs 60 may be generally straight or curved, or may have any other suitable path.

In exemplary embodiments, the ribs 60 may be oriented to extend generally perpendicular to the fibers dispersed in the polymer material that forms the insert 50. Thus, the longitudinal axis of the ribs 60 may be so oriented. In other embodiments, the ribs 60 may be oriented to extend generally parallel to the longitudinal direction 32. In alternative embodiments, however, the ribs 60 may extend in any suitable direction, at any suitable angle, to the fiber of the insert 50 and/or to the longitudinal direction 32. The ribs 60 may facilitate bonding of the insert 50 to the hollow body 30 during forming of the pipe assembly 12, and/or may further reinforce the pipe assembly 12.

Each rib 60 may have a height 64 and a width 66. In some embodiments, the width 66 may be approximately two times the height 64. In other embodiments, the width 66 may be approximately three times the height 64. In still other embodiments, the width 66 and height 64 may have any suitable ratio, as desired or required.

An insert 50 of the present disclosure is formed separately from the hollow body 30 and before forming of the hollow body 30. The insert 50 may be formed using any suitable process, as discussed above. After formation of the insert 50, a formed insert 50 may be utilized during forming of the hollow body 30 and pipe assembly 12. For example, in embodiments wherein the hollow body 30 is formed through injection molding, one or more inserts 50 may be placed into the mold before the polymer material with dispersed fibers of the hollow body 30 is flowed into the mold. The polymer material with dispersed fibers may then be flowed into the mold, and may flow around the insert 50 in the mold. Notably, the insert 50 may be position in the mold such that, when the polymer material with dispersed fibers of the hollow body 30 is flowed into the mold, the knit line 48 is formed such that the insert 50 is in contact with and extends across at least a portion of the knit line 48. The insert 50 may further be positioned so that the fibers dispersed in the polymer material of the insert 50 are oriented at a suitable angle with respect to the knit line 48, as discussed above.

In exemplary embodiments, the insert 50 may be preheated before flowing the polymer material with dispersed fibers of the hollow body 30 into the mold, or heated during molding, or otherwise heated during or preheated prior to forming of the hollow body 30. This facilitates thermal bonding of the insert 50 and hollow body 30, and particularly thermal bonding of the polymer materials thereof. In some exemplary embodiments, the insert 50 is heated or preheated to within approximately 10 degrees from the melting point before or during the formation of the hollow body 30. Thermal bonding of the insert 50 and hollow body 30 allows interpenetration of the fibers of the hollow body 30 and insert 50, thus further strengthening and reinforcing the hollow body 30, particularly at and across the knit line 48. Thus, the use of inserts 50 during formation of the hollow body 30 produces a pipe assembly 12 with advantageously increased pressure ratings.

As discussed, in a formed pipe assembly 12, one or more inserts 50 are bonded to a hollow body 30. The insert 50 is positioned on the hollow body 30 in contact with at least a portion of the knit line 48, and may thus extend across this portion of the knit line 48. In some embodiments, the insert 50 may be positioned on the hollow body 30 in the curved portion 36 of the hollow body 30 as shown. This advantageously provides reinforcement of the knit line 48 in the curved portion 36. In other embodiments, the insert 50 may be positioned on the hollow body 30 in a straight portion 38, or in any other suitable portion as desired or required.

Still further, the inner surface 52 of the insert 50 may be flush with, or may protrude from, the inner surface 42 of the hollow body 30. For example, in some embodiments, as shown in FIG. 3, the inner surface 52 may protrude from the inner surface 42 of the hollow body 30. In these embodiments, the outer surface 54 of the insert 50 may be in contact with the inner surface 42 of the hollow body 30, or the outer surface 54 of the insert 50 may be contained within the hollow body 30 between the inner surface 42 and outer surface 44 of the hollow body 30, or the outer surface 54 of the insert 50 may be flush with the outer surface 44 of the hollow body 30. In some of these embodiments, the insert 50 may have a thickness 56, and thus protrude from the inner surface 42 by an amount, such that the inner surface 52 of the insert 50 is flush with a connector 16 coupled to the pipe assembly 12 as shown in FIG. 2. In other embodiments, as shown in FIG. 4, the inner surface 52 of the insert 50 may be flush with the inner surface 42 of the hollow body 30. In these embodiments, the outer surface 54 of the insert 50 may be in contact with the inner surface 42 of the hollow body 30, or the outer surface 54 of the insert 50 may be contained within the hollow body 30 between the inner surface 42 and outer surface 44 of the hollow body 30, or the outer surface 54 of the insert 50 may be flush with the outer surface 44 of the hollow body 30.

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A fiber reinforced polymer insert for a pipe assembly, comprising:
   an insert having a front side and an opposing back side, the front side and opposing back side defining a thickness therebetween,
   the insert formed from a polymer material having a plurality of fibers dispersed therein, the fibers having an anisotropic orientation,
   the insert configured for bonding in the pipe assembly such that the fibers of the insert span a knit line of the pipe assembly.

2. The fiber reinforced polymer insert of claim 1, wherein the polymer material is a thermoplastic.

3. The fiber reinforced polymer insert of claim 1, wherein the polymer material is a polyolefin.

4. The fiber reinforced polymer insert of claim 1, wherein the plurality of fibers are long fibers.

5. The fiber reinforced polymer insert of claim 1, wherein the plurality of fibers are generally unidirectional.

6. The fiber reinforced polymer insert of claim 1, further comprising a plurality of surface features included on the front side of the insert.

7. The fiber reinforced polymer insert of claim 6, wherein the surface features are ribs.

8. The fiber reinforced polymer insert of claim 7, wherein each of the plurality of ribs has a height to width ratio of approximately 1 to 3.

9. The fiber reinforced polymer insert of claim 7, wherein each of the plurality of ribs extend generally perpendicular to the plurality of fibers.

10. A pipe assembly, comprising:
    a hollow body formed from a polymer material having a plurality of fibers dispersed therein, the hollow body defining a knit line; and
    an insert bonded to the hollow body, the insert formed from a polymer material having a plurality of fibers dispersed therein, the fibers of the insert having an anisotropic orientation and spanning the knit line of the hollow body.

11. The pipe assembly of claim 10, wherein the polymer material of the hollow body and the polymer material of the insert are thermoplastics.

12. The pipe assembly of claim 10, wherein the polymer material of the hollow body and the polymer material of the insert are a polyolefin.

13. The pipe assembly of claim 10, wherein the plurality of fibers of the insert are long fibers.

14. The pipe assembly of claim 10, wherein the plurality of fibers of the insert are generally unidirectional.

15. The pipe assembly of claim 10, wherein the plurality of fibers of the insert are generally perpendicular to the knit line.

16. The pipe assembly of claim 10, wherein the insert further comprises a plurality of surface features included on a front side of the insert.

17. The pipe assembly of claim 16, wherein the surface features are ribs.

18. The pipe assembly of claim 17, wherein each of the plurality of ribs has a height to width ratio of approximately 1 to 3.

19. The pipe assembly of claim 17, wherein each of the plurality of ribs extend generally perpendicular to the plurality of fibers.

20. A method for forming a pipe assembly, the method comprising:
    forming an insert from a polymer material and a plurality of fibers such that the fibers are dispersed in the polymer material in an anisotropic orientation;
    forming a hollow body from a polymer material and a plurality of fibers such that the fibers are dispersed in the polymer material; and
    bonding the insert to the hollow body during forming of the hollow body such that the fibers of the insert span a knit line of the hollow body.

* * * * *